TELEVISION CIRCUIT
Filed Sept. 28, 1965
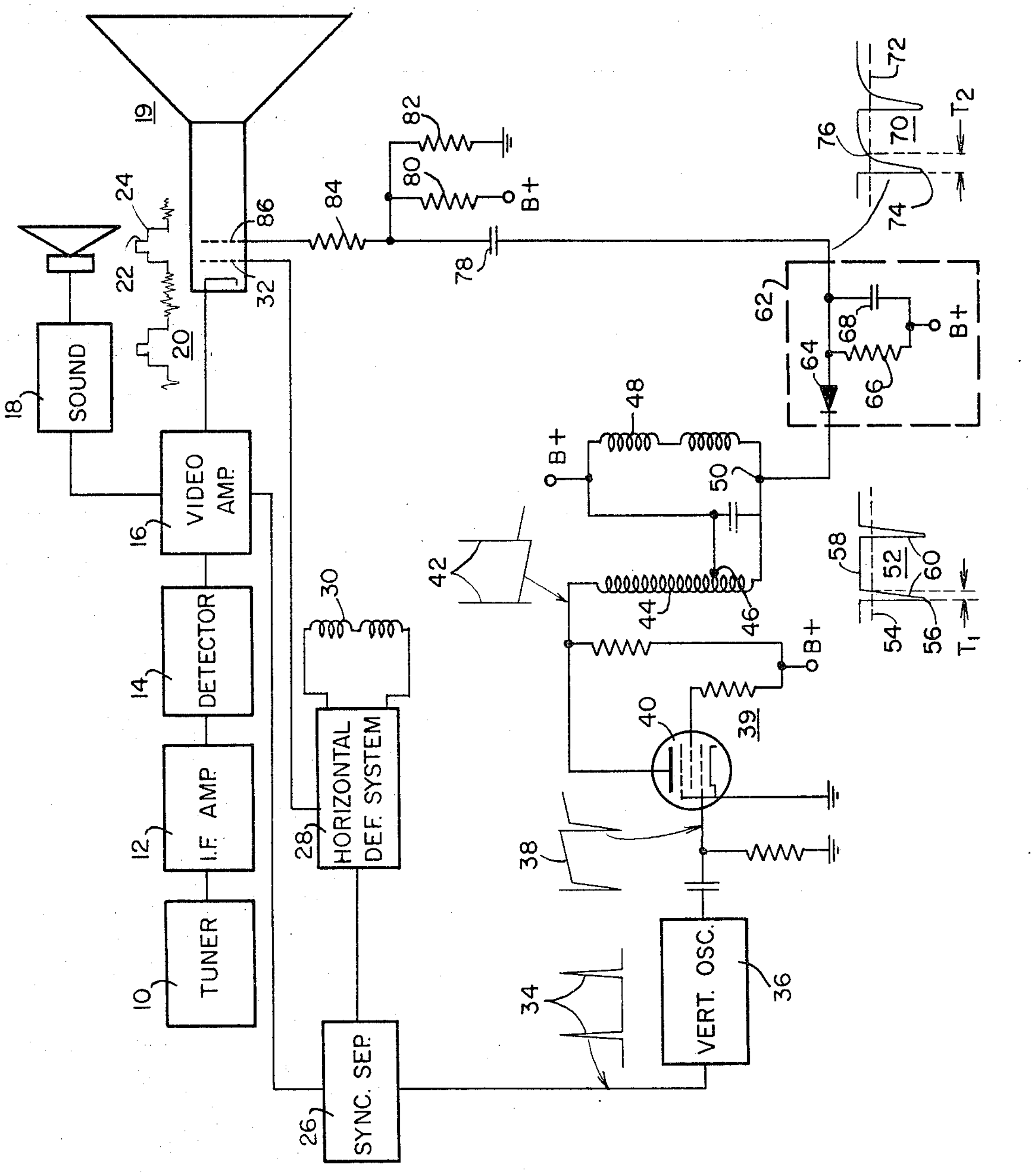
INVENTOR
THEODORE V. LESTER
BY
Mueller, Aichele & Rauner
ATTYS.

United States Patent Office 3,426,240

Patented Feb. 4, 1969

3,426,240

TELEVISION CIRCUIT

Theodore V. Lester, Chicago, Ill., assignor to Motorola, Inc., Franklin Park, Ill., a corporation of Illinois Filed Sept. 28, 1965, Ser. No. 490,900

U.S. Cl. 315—22 2 Claims

Int. Cl. H01j 29/70

ABSTRACT OF THE DISCLOSURE

A circuit for increasing the pulse width of a blanking pulse applied to the cathode ray tube of a television receiver includes a capacitor coupled in parallel with a resistor. A rectifier couples pulses from a pulse source to the capacitor charging the capacitor according to the amplitude of the pulses. The capacitor discharges through the resistor so that the discharge time for the capacitor is greater than its charging time to increase the width of the blanking pulse.

The cathode ray tube scanning beam in a television receiver is continuously deflected in an orderly sequence to scan all the picture elements in the image. The scanning is accomplished by synchronizing a vertical oscillator and a horizontal oscillator in the receiver with the vertical and horizontal scanning frequencies in the transmitter. The beam will alternately trace and retrace the raster until a field is completed after which the beam will retrace vertically in preparation to scan a second field, the combination of these two fields being a reproduction of the image transmitted.

The received video signal contains blanking pulses to completely de-energize the picture screen during retrace of the cathode ray beam. However, since the blanking impulses may not be sufficient to entirely suppress the vertical return beam deflection, a blanking circuit is employed to couple a negative pulse from the vertical oscillator to a control grid of the cathode ray tube. This pulse must be of sufficient magnitude to drive the control grid below cutoff, and also must be sufficient in duration to maintain the control grid below cutoff for the entire retrace interval.

The blanking circuit generally comprises a wave shaping network to increase the available pulse width. Although this network generally provides attenuation of the pulse in prior art circuits, the resulting losses do not impair the blanking requirements because ample B+ is available from the television power supply to allow the deflection circuitry to develop a pulse of sufficient magnitude to compensate for the attenuation of the network. However, in many present day television sets, for economic reasons, a half wave rectifier is used in the power supply thereby decreasing the available B+ voltage so that attenuation of the blanking pulse in the blanking network would appreciably impair the ability of the network to extinguish the beam during retrace.

It is an object of the present invention to provide an improved beam blanking circuit for preventing the appearance of retrace lines on the screen of the cathode ray tube.

Another object is the complete blanking of retrace lines in receivers having relatively low amplitude retrace pulses, due, for example, to relatively low B+ available from the receiver power supply.

Still another object is to shape the retrace pulse to a duration sufficient for blanking with a minimum amount of attenuation.

One feature of this invention is a circuit in a television receiver for extinguishing the beam of a cathode ray tube during retrace, having a rectifier to limit pulse attenuation where low amplitude blanking pulses are available from the deflection circuit, due, for example, to a low B+ power supply and further to make the pulse available for blanking operation immediately following its being generated by the deflection circuit.

Another feature of this invention is a blanking circuit, having an integrating network and a controlled charging circuit to extend the width of a blanking pulse generated by the deflection circuitry to a duration so that the return movement of the cathode ray tube beam is removed from the picture tube face for the entire retrace time interval.

The invention is illustrated in a single figure of the drawing which is a block and schematic diagram showing the improved blanking circuit incorporated in a television receiver.

In practicing the invention, a blanking circuit couples a pulse occurring during a retrace time interval to a control grid of the cathode ray tube in a television receiver to extinguish the beam. The blanking circuit is comprised of a rectifier and an integrating circuit. When the cathode ray tube beam starts to retrace, a pulse from the deflection system forward biases the rectifier and is conducted therethrough to charge up a capacitor in the integrating circuit. When the voltage across the capacitor reaches a predetermined amplitude, the picture tube is cutoff. Since a forward biased rectifier is a relatively small resistance, the pulse is available for blanking operation with negligible attenuation. In addition, the charge-up time on the integrating circuit capacitor will be relatively fast so that the pulse is available for blanking operation almost instantaneously. As the pulse decays, the diode is no longer forward biased so that the capacitor discharges through a relatively large resistor in the integrating circuit, but maintains sufficient voltage to keep the picture tube cutoff for the duration of the retrace time interval.

Referring now to the drawing, the illustrated television receiver includes a tuner 10 which selects the signals from an associated antenna to convert a received signal to a fixed frequency for further selection and amplification in IF amplifier 12. Amplifier 12 is coupled to the detector 14 which demodulates a received composite video signal having pulses representing blanking and synchronizing components, video frequency components, and a modulated sound carrier. The demodulated television signal is applied to the video amplifier 16 and this circuit provides a sound subcarrier which is coupled to the sound system 18.

Video amplifier 16 is further coupled to the synchronizing signal separator circuit 26 which amplitude separates both the vertical and horizontal synchronizing components of the composite video signal. The horizontal synchronizing signal, is then applied to the horizontal deflection circuit 28 which develops a suitable sawtooth scanning current in the horizontal deflection winding 30 which is in fact disposed on the neck of the cathode ray tube 19.

The composite video signal, shown by waveform 20, is applied to the cathode of picture tube 19 and includes the video signal portion, blanking pulses, and synchronizing pulses with the smallest amplitudes corresponding to the whitest parts of the picture while the darker parts of the picture have larger amplitudes. Higher amplitudes correspond to progressively darker picture information until the black level, shown at 24, is reached. At this level the picture tube 19 is cutoff. Any signal amplitude greater than the black level is blacker than black, because the voltage drives the picture tube below cutoff. This region is labeled 22. The blanking and synchronizing pulses occupy the black and blacker than black regions of the video signal. During retrace, blanking pulses drive the video signal to the black level with the synchronizing pulses driving the signal to the blacker than black region. Often, however, the blanking and synchronizing pulses are insufficient to keep the retracing beam from appearing on the face of the picture tube. To more effectively remove the retrace lines, horizontal and vertical blanking circuits are employed. For horizontal blanking,, pulse signals at the horizontal frequency are coupled from the horizontal deflection circuit 28 to the grid 32 to cut off the picture tube during horizontal retrace. Similarly, vertical blanking is accomplished by coupling pulses at the vertical frequency through blanking circuit 62 to grid 86.

Considering now the operation of the vertical blanking circuit, vertical synchronizing pulses 34 occurring during the retrace time intervals are coupled from the synchronizing signal separator 26 to vertical oscillator 36. The output waveform 38 is in synchronization with the transmitter scanning frequency and is applied as a drive signal to tube 40 of vertical output circuit 39. The positive polarity pulses 42 on the plate of tube 40 will be reversed in polarity at terminal 50 because the tap 46 on transformer winding 44 is connected to B+ which is AC ground. The resultant voltage waveform 52 is developed across vertical deflection coil 48, which is disposed on the neck of the cathode ray tube 19, to cause a sawtooth current to flow therethrough for sweeping the electron beam across the picture tube face.

During the period when the beam is being traced across the picture tube screen, the relatively flat portion 58 of waveform 52, will be present at terminal 50, while during retrace, negative pulses 60 will be present and will be conducted to blanking circuit 62 to cutoff picture tube 19 as more fully explained hereinafter.

Resistors 80 and 82 comprise a voltage divider network to establish an operating potential for grid 86. Resistor 84 is included to protect diode 64 from cathode ray tube arcs. Capacitor 78 is a DC blocking capacitor and provides a coupling path to grid 86 for the negative blanking pulses.

Since transformer winding 44 is essentially a short circuit to DC, terminal 50 will have a quiescent operating voltage of the value of B+. One terminal of resistor 66 is connected to B+ so that there is no net potential difference across diode 64 during the period when waveform 52 is flat as shown at 58. As was previously stated, during retrace negative pulses 60 will be present at terminal 50. When the pulse 60 reaches the amplitude labeled 54, diode 64 will be forward biased. As the pulse 60 increases in magnitude and exceeds amplitude 54, the diode 64 will be rendered heavily conductive. Now diode 64 is, in effect, a very small resistance so that the pulse will be conducted therethrough with very little attenuation. Thus, the negative pulse will charge capacitor 68 to a voltage, labeled 74 on waveform 70, very nearly equal to the amplitude 56 on pulse 60. The time to charge capacitor 68 will depend on the product of its value and the effective resistance of diode 64. Since the diode's resistance is relatively small when it is forward biased, the time to charge capacitor 68 to a value 72 necessary to cutoff picture tube 19 will be relatively short. The voltage buildup on capacitor 68 will be conducted through coupling capacitor 78 and limiting resistor 84 to grid 86 to cutoff the picture tube.

Diode 64 will remain conductive until pulse 60 reaches its peak amplitude 56, at which time the diode will be cutoff and will be, in effect, a very high resistance. The charge build up on capacitor 68 during the time the diode was forward biased will discharge through resistor 66, the resistance of which is considerably higher than the resistance of diode 64 when it is forward biased. Since the discharge time depends on the product of the values of capacitor 68 and resistor 66, it will be considerably longer than the charge time, the result of which is to maintain capacitor 68 at the picture tube cutoff voltage, labeled 72, for a period of time $T_2$. When the voltage on capacitor 68 decays to a value greater than amplitude 72 in the positive direction, shown at 76, grid 86 will no longer be cutoff and the picture tube will then be operable to perform its trace function.

The pulse 60 of waveform 52 will cutoff the picture tube only when its amplitude exceeds the value shown at 54. If this pulse were directly applied to capacitor 78, the picture tube would be cutoff for a duration $T_1$ which is too short to maintain the retrace lines extinguished for the entire retrace time interval. Circuit 62 operates to extend the time interval that a cutoff voltage is available to a duration $T_2$ with negligible decrease in pulse amplitude so that the picture tube is cutoff for the entire retrace time interval.

What has been described, therefore, is a simple and economical circuit for blanking a cathode ray tube in a television receiver, said circuit offering negligible attenuation to the blanking pulse available from the deflection circuit and at the same time extending the pulse duration from a width $T_1$ to a greater width $T_2$ so as to effectively cutoff the picture tube for the entire duration of the retrace time interval.

I claim:

1. A circuit for blanking the beam of a cathode ray in a television receiver during a vertical retrace time interval, including in combination, a source of pulses occurring during the retrace time interval, a vertical deflection coil coupled to said source for producing vertical trace and retrace across the cathode ray tube screen, rectifier means coupling said vertical deflection coil to a grid bias circuit, said grid bias circuit coupled to a control grid on said cathode ray tube and providing an operating potential for said control grid, said rectifier means poled so that the same is conductive in the presence of a pulse of a predetermined amplitude to cut off said control grid, an RC combination comprising resistance means and capacitance means connected in parallel with one end of said RC combination connected to a reference potential and the other end connected to the junction of said rectifier means and said grid bias circuit, said RC combination operating to maintain a cutoff voltage on said control grid for a predetermined time after said pulse has decayed below said predetermined amplitude.

2. A circuit for blanking the beam of a cathode ray tube in a television receiver during a retrace time interval, including in combination, a source of pulses occurring during the retrace time interval, a cathode ray tube having a control electrode, a beam blanking circuit coupling said source to said control electrode, said beam blanking circuit including rectifying means having an input coupled to said source and an output coupled to said control electrode, resistance means and capacitance means connected in parallel between said output of said rectifying means and a reference potential, said pulses acting to bias said rectifying means to conduction whereby said pulses are coupled through said rectifying means to be applied to said control electrode to cutoff said cathode ray tube, said pulses further acting to charge said capacitor to maintain a cutoff potential on said control electrode for a predetermined period of time.

References Cited

UNITED STATES PATENTS

| | | | |
|---|---|---|---|
| 2,677,783 | 5/1964 | Wilson | 315—22 |
| 3,122,674 | 2/1964 | Buechel | 315—22 |
| 3,243,647 | 3/1966 | De Leers | 315—22 |
| 3,303,282 | 2/1967 | Humphrey | 315—22 X |
| 2,607,847 | 8/1952 | Heisig. | |
| 2,789,251 | 4/1957 | Ebbeler. | |
| 2,940,004 | 6/1960 | Bonner. | |
| 3,090,889 | 5/1963 | Levinson. | |
| 3,146,372 | 8/1964 | Fertig. | |

RODNEY D. BENNETT, *Primary Examiner.*

B. L. RIBANDO, *Assistant Examiner.*